United States Patent [19]

Trihey

[11] 4,321,909
[45] Mar. 30, 1982

[54] SERVO-CONTROLLED SOLAR TRACKING APPARATUS

[75] Inventor: John M. Trihey, Ringwood, Australia

[73] Assignee: Vulcan Australia Limited, Victoria, Australia

[21] Appl. No.: 122,054

[22] Filed: Feb. 15, 1980

Related U.S. Application Data

[63] Continuation-in-part of Ser. No. 883,313, Mar. 3, 1978, which is a continuation-in-part of Ser. No. 704,674, Jul. 12, 1976, Pat. No. 4,089,323.

[30] Foreign Application Priority Data

| Jul. 11, 1975 | [AU] | Australia | PC2334 |
| Apr. 21, 1977 | [AU] | Australia | PC9839 |
| Feb. 23, 1979 | [AU] | Australia | PD7808 |
| Aug. 23, 1979 | [AU] | Australia | PE0157 |
| Aug. 23, 1979 | [AU] | Australia | PE0159 |

[51] Int. Cl.³ .................................................. F24J 3/02
[52] U.S. Cl. ........................................ 126/425; 126/424; 126/438; 126/439; 250/203 R
[58] Field of Search .............. 126/438, 439, 424, 425; 250/203; 350/289; 353/3

[56] References Cited

U.S. PATENT DOCUMENTS

| 1,951,404 | 3/1934 | Goddard | 126/425 |
| 4,031,385 | 6/1977 | Zerlaut et al. | 126/425 X |
| 4,146,785 | 3/1979 | Neale | 126/425 X |
| 4,153,038 | 5/1979 | McDonald | 126/425 |
| 4,178,913 | 12/1979 | Hutchison | 126/438 X |

*Primary Examiner*—Larry Jones
*Attorney, Agent, or Firm*—Cushman, Darby & Cushman

[57] ABSTRACT

The invention provides solar conversion apparatus comprising concentrating means for concentrating solar energy onto at least one surface of a heat transfer conduit, tracking means for causing the concentrating means to track the sun, the tracking means including radiation sensitive elements which are operable on differential thermal expansion thereof to generate tracking control signals and an electric motor for moving said concentrating means, said motor being responsive to said control signals, tracking movement thus being initiated by thermal radiation but is arrested by optical radiation which is of short response time.

35 Claims, 19 Drawing Figures

SERVO-CONTROLLED SOLAR TRACKING APPARATUS

This appln. is a C-I-P of Ser. No. 883,313, Mar. 3, 1978, which is a C-I-P of Ser. No. 704,674, July 12, 1976, now U.S. Pat. No. 4,089,323.

This invention relates to solar conversion apparatus particularly apparatus which is arranged to track the sun and concentrate the sun's energy onto a surface which is in contact with a heat transfer medium.

There are many examples of energy conversion apparatuses of the type noted above but most suffer from the defect of inaccurate tracking which has an adverse effect on the efficiency of operation.

The general object of the invention is to provide a concentrating apparatus which is of relatively simple construction and which tracks accurately and reliably.

According to the present invention there is provided solar conversion apparatus comprising concentrating means for concentrating solar energy onto at least one surface, tracking means for causing the concentrating means to track the sun, said tracking means including radiation sensitive elements which are operable on differential thermal expansion thereof to generate tracking control signals and an electric motor for moving said concentrating means, said motor being responsive to said control signals.

Preferably said radiation sensitive elements have a predetermined response time during which they are subjected to radiation before said control signals are generated for initiating movement of said motor, said tracking means including arresting means for arresting movement of said motor when the concentrating means is concentrating solar energy onto said surface, said arresting means having a response time which is shorter than that of said radiation sensitive elements.

Preferably further, the radiation sensitive elements comprise thermally expansible metallic tapes which function in an analogous manner to those included in the apparatus disclosed in Australian Patent application No. 35176/78 lodged Apr. 17, 1978. The arresting means may comprise at least one photo-cell.

The apparatus defined above has many advantages. One particular advantage is the fact that tracking movements are initiated by concentrated solar energy falling onto the expandible tapes. This almost entirely removes the possibility of the tracking system being subject to stray light which has been found to be a problem with systems which rely simply on photo-electric cells for tracking signals. Further, the apparatus of the invention utilizes a photo-cell to arrest movement of the concentrating means and this has the particular advantage that it can be made to have a very short response time so that the concentrating means is stopped right at the instant in which it is correctly directed at the sun. Further, the photo-cell or cells can be arranged to be responsive only to concentrated solar energy from the concentrating means itself thereby further eliminating the possibility of stray signals affecting the tracking operation of the apparatus.

The invention also provides a novel trough construction which results in parabolic troughs of very accurate shape which is also of importance in achieving efficient operation of the conversion apparatus.

The invention will now be further described with reference to the accompanying drawings, in which.

Figure 1:
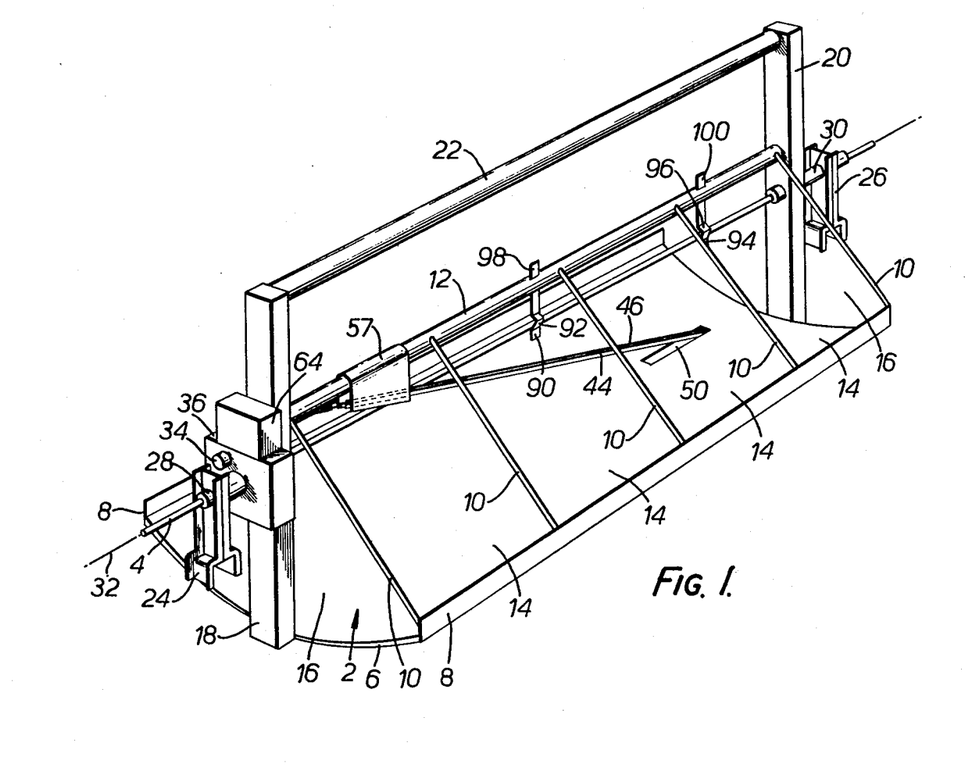
FIG. 1 is a perspective view of a solar energy conversion apparatus construction in accordance with the invention.

Referring first to FIG. 1, there is shown a solar collecting apparatus in accordance with the invention, the apparatus comprising a generally parabolic reflective trough 2 arranged to concentrate solar energy on a stationary heat transfer tube 4. The tube 4 is preferably oriented in the North-South direction and at a predetermined elevation angle in accordance with the latitude of the site where the apparatus is to be used. Tracking means is provided to cause the trough 2 to track the sun from the east to the west during the course of the day.

The trough is mounted in an outer housing 6 fabricated from sheet metal and having a pair of short side walls 8. Frame members 10 extend from the side walls 8 to a longitudinal support bar 12 at spaced intervals and define between them window areas which are covered by panes of glass 14. The ends of the trough are also closed by appropriately shaped glass panes 16.

The apparatus also includes end uprights 18 and 20 which at their lower ends are connected to the housing 6, near their mid points to the bar 12, and at the upper ends to a counterweight bar 22.

The apparatus is provided with support brackets 24 and 26 at either end thereof, the bracket 26 mounting a first shaft 28 and the bracket 26 mounting a second shaft 30. Generally speaking, the uprights 18 and 20 are rotatably connected to the shafts 28 and 30 so that tracking movements are effected about a tracking axis 32 which is concentric with the shafts 28 and 30. The shafts 28 and 30 are hollow and the tube 4 passes therethrough.

Rotation of the trough 2 about the axis 32 is effected by an electric motor 34 which drives a gear box 36, the motor and gear box 36 being connected to and rotatable with the upright 18. The inner end of the shaft 28 is formed with a final drive gear 38 which is stationary (see FIG. 5) and meshes with another gear (not shown) in the gear box to effect the necessary driving connection between the shaft 28 and the trough. The motor 34 may be battery driven or may be fed through step rings by power derived from a mains supply. A very important aspect of the invention concerns the generation of control signals to the motor 34 to thus control the tracking movements of the trough, and this will be described in detail later.

Figures 7, 8:
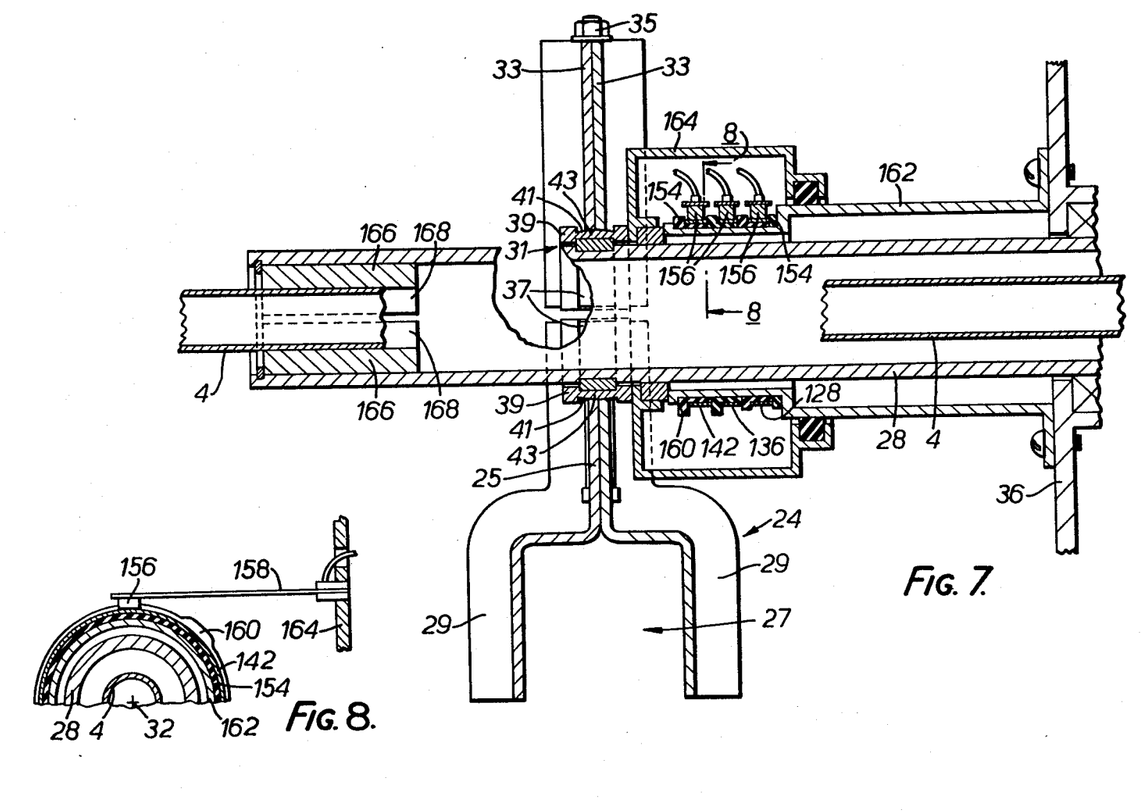
FIG. 7 is a longitudinal section through one end of the apparatus, the figure joining FIG. 5 along the line 7—7 but on an enlarged scale.
FIG. 8 is a schematic cross-section taken along the line 8—8.

The end bracket 24 is illustrated in more detail in FIG. 7. The bracket is formed from a pair of plate members 25 which are stepped to form a channel 27 for receipt of a timber beam or the like for mounting of the apparatus. The plates 25 include peripheral flanges 29 for additional stiffnes. The bracket is connected to the shaft 28 by means of a collar assembly 31, which is clamped to the plates 25 by a second pair of plates 33 which in turn are connected to the plates 25 by long tension bolts 35. The bolts 35 are adjusted so that the collar assembly 31 provides a rigid interconnection between the bracket assembly 24 and the shaft 28 but that will yield if subjected to large forces which might be due to high velocity winds. This prevents damage to the trough and housing. The collar assembly includes a pair of half-rings located in a slot in the shaft 28, the half-rings 37 themselves being located in recesses formed in respective ring carrying members 39. The ring carrying members also include part spherical surfaces 41 against which complementary surfaces 43 formed in the plates 25 and 33 bear. The spherical surfaces 41 and complementary surfaces 43 of the plates 25 and 33 accommodate misalignments between the assembly 24 and the centre of the shaft 28. As mentioned previously, the collar assembly 31 will yield if excessive torques are applied to the shaft 28, yielding occuring between the half-rings 37 and the shaft 28 or the carriers 39. The bracket 26 at the opposite end of the apparatus is of similar construction.

Figures 5, 6:
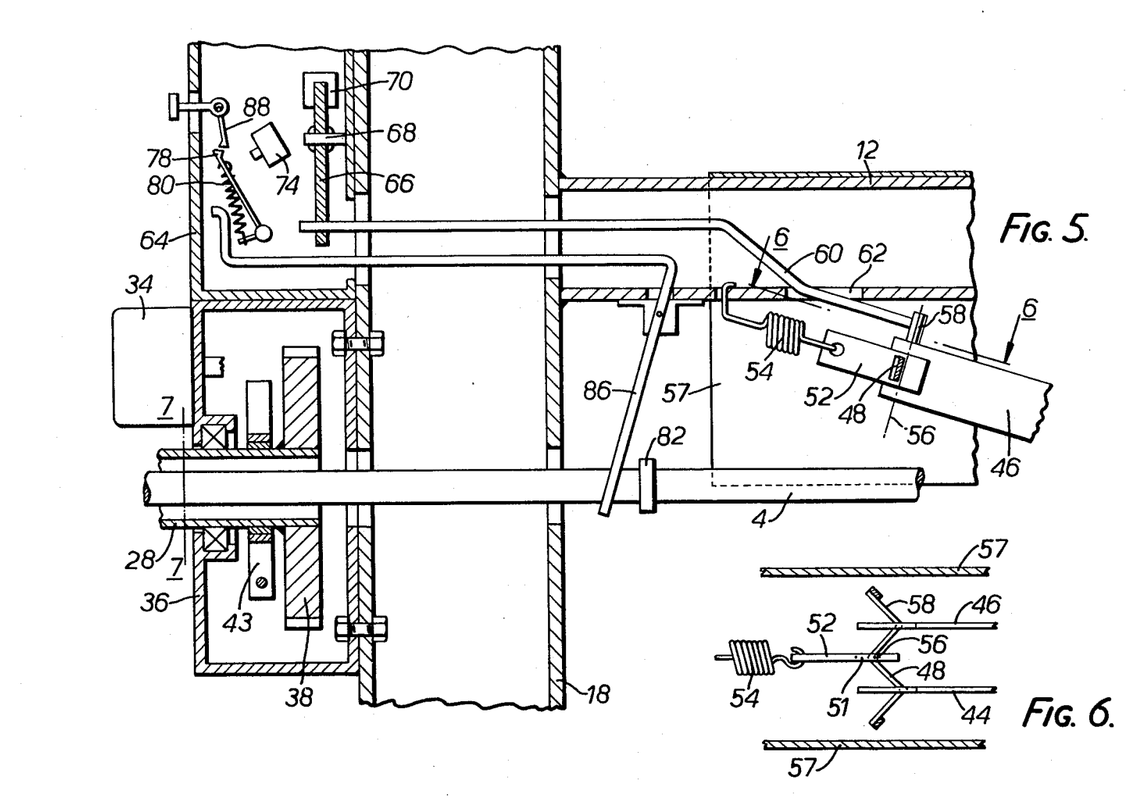
FIG. 5 is a more detailed cross-section taken along the line 5—5.
FIG. 6 is a cross-section taken along the line 6—6.

As seen in FIG. 5, the gear box includes a friction clutch member 43 which applies a predetermined frictional torque between the gear box 36 and the shaft 28 which must be overcome before the gear box rotates relative to the shaft. The clutch 43 thereby serves to resist all mechanical chattering which might be caused for instance by the effects of wind. The clutch 43 need not be located within the gear box 36.

Figures 2, 9, 10:
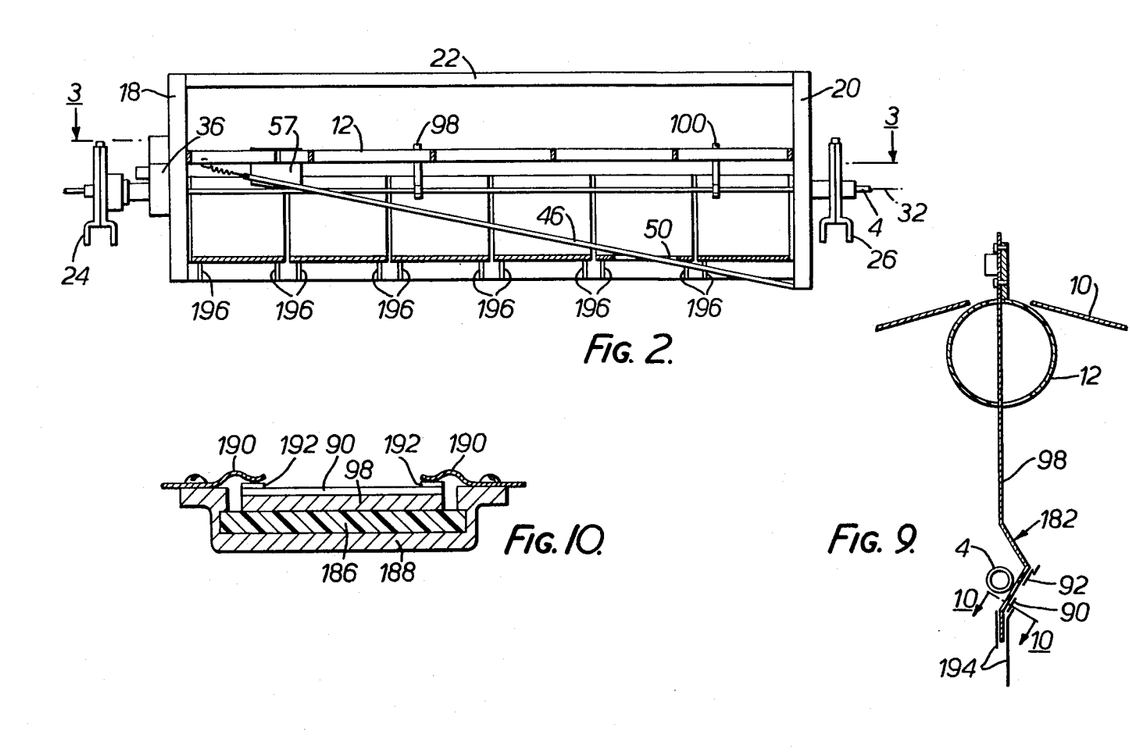
FIG. 2 is a schematic longitudinal cross-section.
FIG. 9 is a transverse section showing an arrangement for supporting photo-electric cells.
FIG. 10 is a more detailed section taken along the line 10—10.
Figures 3, 4:
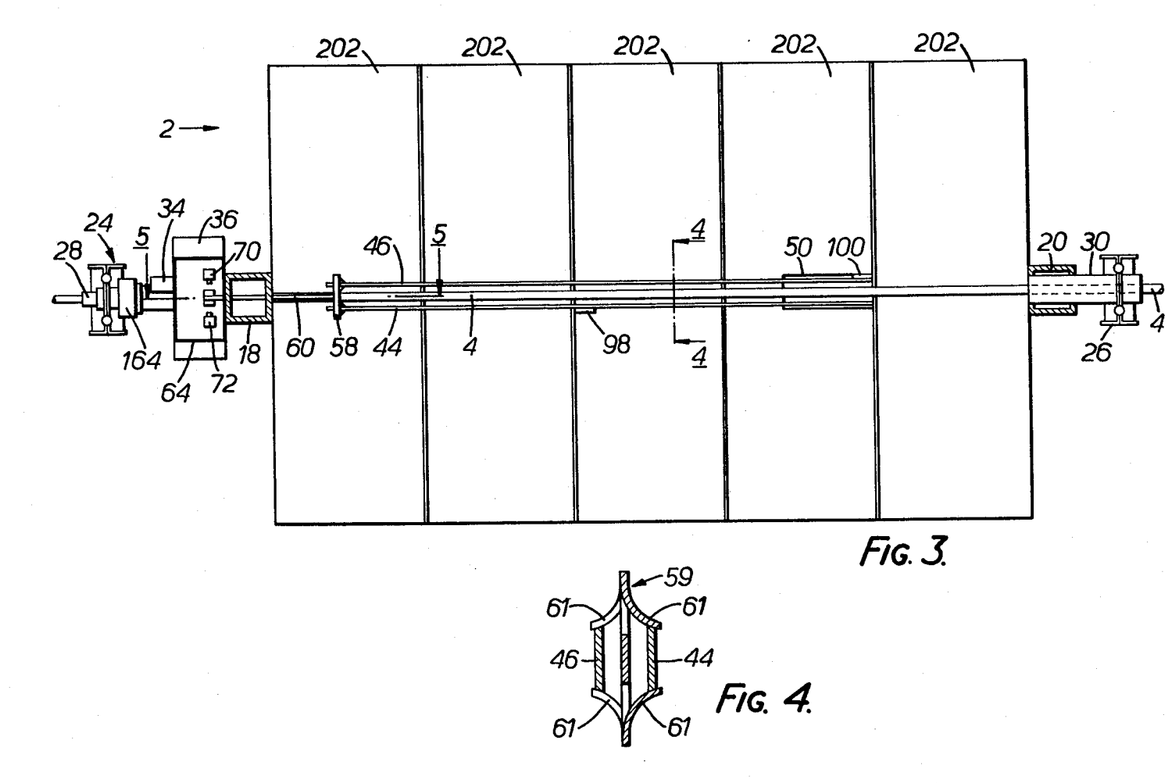
FIG. 3 is a section taken along the line 3—3 marked on FIG. 2.
FIG. 4 is a transverse section taken along the line 4—4.
Figure 13:
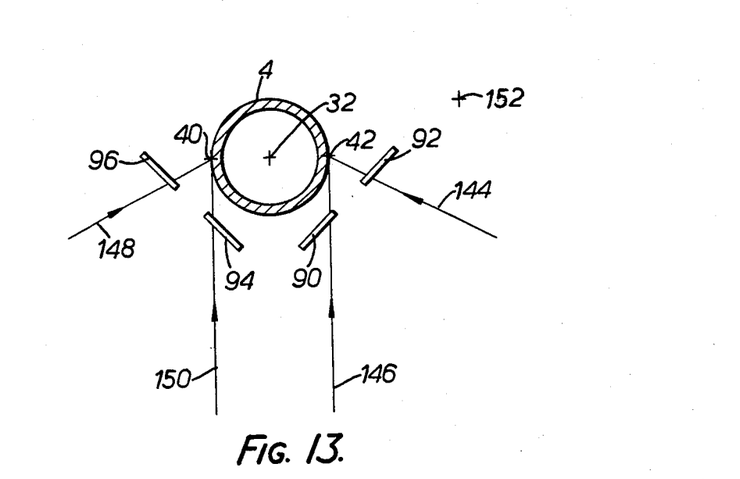
FIG. 13 shows the relationship of photo-electric cells to the heat transfer conduit in the apparatus of the invention.

Generally speaking, the apparatus of the invention includes first heat sensitive elements to initiate rotation of the motor 34 in the appropriate direction and a second element or elements which are responsive to light and/or heat, the second element or elements of small response time and being operative to arrest rotation of the motor 34 when the trough is correctly aligned with the sun. The trough 2 may comprise a single parabolic reflecting surface having a focal line which is concentric with the heat transfer tube 4 however in the preferred arrangement as illustrated the trough 2 comprises a pair of parabolic surfaces which are arranged to produce a pair of parallel focal lines 40 and 42 which preferably lie on opposite sides of the tube 4, as schematically illustrated in FIG. 13. The concept of dual focal lines are disclosed in Australian Patent Appln. No. 35176/78. The thermally responsive elements comprise first and second metallic tapes 44 and 46 which are parallel to one another and as seen in FIG. 3 lie in the central longitudinal plane of the trough but as seen in FIG. 2 are located at an angle to the axis 32. The tapes 44 and 46 preferably comprise blackened mild steel and are arranged to pass through an opening 50 in the trough and are connected to the lower end of the upright 20. The upper ends of the tapes 44 and 46 are connected to a rotatable plate 48, the plate 48 being rotated in accordance with differential thermal expansions of the tapes 44 and 46 caused by misalignment of the trought with the sun. The plate 48 passes through an opening 51 in a support plate 52 which is connected to the support bar 12 by means of a tension spring 54. As best seen in FIG. 6, the plate 48 will rotate about an axis 56 on differential expansion of the tapes 44 and 46, the direction of rotation being dependent on which of the tapes 44 or 46 has been subjected to radiation from the trough.Changes in ambient temperature will cause simultaneous expansion or contraction of the tapes 44 and 46 and such movements are accommodated by the tension spring 54. As explained in the aforementioned application it is necessary to shield the tapes 44 and 46 above the axis and accordingly the upper parts of the tapes 44 and 46, plates 48 and 52 are located within a reflective housing 57 and a reflective shield 59 is located between the tapes as seen in FIG. 4. The shield is formed from tapes 61 to hold it in position beween the tapes. The free ends of the plate 48 are connected to a yoke 58 from which extends an actuating rod 60 which thus also rotates about the axis 56. The rod 60 passes through an opening 62 in the lower wall of the bar 12 and thereafter extends through the tube 12, upright 18, into a housing 64 located above the gear box 36. The free end of the control rod 60 is pivotally connected to one end of a lever 66 which is pivoted at 68 so that its upper end is rotatable between a pair of micro switches 70 and 72, see FIG. 5 and the circuit of FIG. 11. The arrangement is such that when there is no differential expansion of the tapes 44 and 46 the upper end of the lever 66 lies in a neutral position between the micro switches 70 and 72 and does not activate either one of the switches. When however there is a differential expansion of the tapes 44 and 46 after a sufficient temperature rise has taken place in one or other of the tapes 44 or 46 the lever 66 will engage one or other of the micro switches 70 or 72 depending on which of the tapes has risen in temperature.

The housing 64 also contains a pair of micro switches 74 and 76 which are tripped when an over temperature is sensed in the heat transfer tube 4. In the arrangement shown in FIG. 5 the micro switches 74 and 76 are arranged to be activated when struck by a pivoted plate 78. The plate 78 functions as an over-centre device because of the bias applied by a tension spring 80, the spring 80 normally holding the plate 78 away from the micro switches 74 and 76. Over temperatures in the heat transfer tube 4 are sensed by thermal expansions in the tube itself and in this respect one end of the tube is fixed in the shaft 30 but the other end is free to expand and is provided with a collar 82 which upon predetermined expansion of the tube 4 will engage one end of an actuating lever 86 which is pivoted to the bar 12. The other end of the lever 86 passes through the tube, upright 18 and into the housing 64 and lies adjacent to the spring 80. The collar 84 will therefore cause the lever 86 to rotate and so contact the spring 80 causing the plate 78 to snap into a position in engagement with both of the mircro switches 74 and 76. The plate 78 will remain in this position unless reset manually by operation of a reset lever 88.

A differential expansion of the tapes will thus cause rotation of the trough. In accordance with the invention when the trough is correctly aligned with the sun photo-electric cells are activated and cause the motor to stop rotation of the trough. The cells have a very short response time so as to ensure that the trough stops accurately when it reaches the correctly aligned position. In the arrangement illustrated in FIGS. 1 and 13 there are four photo-electric cells arranged in pairs 90, 92 and 94, 96 on opposite sides of the axis 32. The first pair 90, 92 are supported by a support plate 98 which extends downwardly from the bar 12 and the second pair 94, 96 are mounted on a support plate 100 which extends downwardly from the bar 12 but is spaced axially from the plate 98. Turning now to the circuit diagram of FIG. 11, it will be seen that the cells 92 and 94 are connected in parallel to an energizing coil 102 of a relay 104. The cells 90 and 96 are connected in parallel to an energizing coil 106 of a relay 108. The arrangement is such that when either of the cells 92 or 94 is irradiated by concentrated solar radiation the contact arm 110 will move to its open circuit position and similarly if either of the cells 90 and 96 is irradiated by concentrated radiation the contact arm 112 will move to its open circuit position. The circuit will however function with only a single pair of cells say 90 and 92 but it is desirable to include a duplicate pair 94 and 96 so that if the cells 90 and 92 should fall into shadow, say caused by one of the frame members 10, the other pair of cells 94 and 96 will still function and thus ensure correct operation of the circuit. Similarly the location of the cells on opposite sides of the axis 32 further reduces the possibility of all cells being in shaded zones simultaneously. The cells 90, 92, 94 and 96 will not produce sufficient current to actuate the relays 104 and 108 unless exposed to concentrated solar radiation and thus it is not necessary to shield them from directly incident radiation.

The full circuit of FIG. 11 will now be described. The motor 34 is connected to the contact arms of the over-temperature micro switches 74 and 76 and these arms normally contact terminals 114 and 116 which are connected respectively to the contact arms of micro switches 70 and 72. The contact arms of the micro switches 70 and 72 normally engage terminals 118 and 120 and these terminals are respectively connected to terminals 122 and 124. The contact arms 110 and 112 of the relays 104 and 108 normally engage respectively the terminals 122 and 124. The other ends of the contact arms 110 and 112 are connected to a positive line 126 which is connected to a positive voltage source via a slip ring 128. The micro switches 70 and 72 include terminals 130 and 132 respectively which are connected to a negative line 134 which is connected to the negative terminal of the supply via a slip ring 136. The micro switches 74 and 76 include terminals 138 and 140 respectively, the terminal 138 being connected to the negative line 134 and the terminal 140 being connected to the positive line 126 via a slip ring 142.

In the position of the circuit as illustrated the motor 34 is not energized since both of its leads are connected through the various micro switches and relays to the positive line 126. In this position the lever 66 (see FIG. 5) does not engage either of the micro switches 70 and 72, the trough 2 being correctly aligned with the sun. When however the sun moves relative to the trough the contact arm of one or other of the lever 68 will cause movement of one or the other of the contact arms of the switches 70 and 72 to engage the terminals 130 or 132. In this case the circuit to the motor 34 is complete since one of the terminals 130 or 132 will be connected to the negative line 134. This will cause rotation of the motor 34 in the direction appropriate for realignment of the trough with the sun. Assuming that the contact arm of the switch 132 has been moved so as to engage the terminal 132 rotation of the motor 34 will occur and will continue until the trough reaches its correct alignment with the sun in which case the cells 90, 92, 94, 96 will be irradiated with concentrated solar radiation. The irradiation of the cells 90 and 96 will be of no effect since the relay 130 has effectively been removed from the circuit by the micro switch 72. However, the currents generated in one or both of the cells 92 and 94 will cause the contact arm 110 of the relay arm 104 to disengage the terminal 122 and thus break the circuit to the motor 34 and arrest the trough in a position in which it is correctly aligned with the sun i.e. wherein the focal lines 40 and 42 lie on the surface of the tube 4. A similar mode of operation occurs when the lever 68 causes the contact arm of the micro switch 70 to contact terminal 130 except that the direction of rotation of the motor 34 is reversed.

Once the apparatus has been brought into correct alignment with the sun and the apparatus is tracking the sun, that tape which is located on the westward side of the apparatus will be more or less continuously irradiated by the sun so in this mode one of the switches 70 or 72 may continuously have its contact arm in engagement with the terminals 130 or 132 the motor circuit being broken by the cells 90, 96 or 92, 94 operating the relays 108 or 104. Thus in this mode the response time is short i.e. the response times of the cells. The apparatus has been tested and in this mode the motor typically runs for 0.25 to 0.5 sec. followed by a period of say one minute in which it does not run.

FIG. 13 illustrates more accurately the location of the cells 90, 92, 94 and 96 relative to the tube 4. In this diagram the trough 2 is correctly aligned with the sun and the focal lines 40 and 42 lie on the surface of the tube 4. The diagram shows extreme rays 144 and 146 from the outer and inner edges of the right hand parabolic portion of the trough are shown as well as the extreme rays 148 and 150 of the left hand parabolic portion.

It will be noted that the cells 90 and 92 are located so that their adjacent inner edges are impinged by the extreme rays 146 and 144 respectively. Similarly, the inner edges of the cells 94 and 96 are impinged by the extreme rays 150 and 158. The particular arrangement ensures that the motor circuit is broken only by rays falling on the adjacent inner edges of the cells rather than on the outermost edges of the cells which would introduce inaccuracies in the tracking. To illustrate this, assume that the trough is out of alignment with the sun in which case the focal line 142 will for instance be located say at the point marked 152. With such a misalignment the lever 66 will cause the contact arm of the micro switch 70 to engage terminal 130 and thus initiate rotation of the motor 34. This will cause the focal line to move from the point 152 towards its position indicated by numeral 142. During the course of this movement the focal line will impinge on the outer edge of the cell 92 but this is of no consequence since the relay 104 has effectively been isolated by the micro switch 70. When however concentrated radiation falls on the cell 90, the circuit to the motor will be broken and so arrest rotation. A corresponding mode of operation occurs when the misalignment is in the opposite sense.

Figure 11:
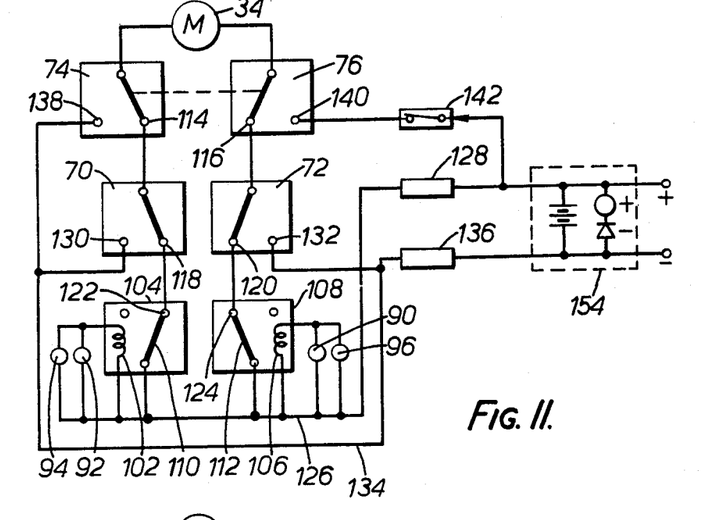
FIG. 11 illustrates a circuit useful in controlling the apparatus of the invention.

The voltage source connected to the slip rings 128 and 136 could comprise an rectified voltage from an AC mains supply or could alternatively comprise a battery with photo electric charging circuit 154 as shown in broken lines in FIG. 11.

In the event of an over temperature being sensed in the tube 4, the plate 78 will simultaneously cause the contact arms of the micro switches 74 and 76 to engage respectively terminals 138 and 140 thus giving a direct circuit to the motor 34 bypassing the switches 70 and 72 and relays 104 and 108. This will cause rotation of the motor 34 and rotation will continue until the circuit to the motor is broken by means of a cam switch associated with the slip ring 142. FIGS. 7 and 8 illustrate a preferred configuration for the slip rings 128, 136 and 142. The slip rings are located on collars 154 formed from insulating material. The rings cooperate with carbon blocks 156 which are biased towards the rings by means of respectively leaf springs 158, as best seen in FIG. 8. The insulating collar 154 associated with slip ring 142 is formed with a projecting cam portion 160 which on appropriate rotation thereof with the trough, will engage the leaf conductor 158 and lift the block 156 from the ring 142 and thereby break the circuit to the motor 34 when the trough is pointing directly downwards so that it cannot receive any further solar radiation. The insulating rings 154 are located on a rebated portion of a hollow cylindrical body 162 which is connected to the gear box 36 and is accordingly rotatable therewith. The slip rings and carbon blocks 156 are located within a protective housing 164 which is connected to the end bracket 24.

FIG. 7 also illustrates one form of support for the tube 4 in the shaft 28. In this arrangement the support comprises a pair of semicylindrical ceramic members 166 formed with respective recesses 168 which are of complementary configuration to the tube 4.

Figure 12:
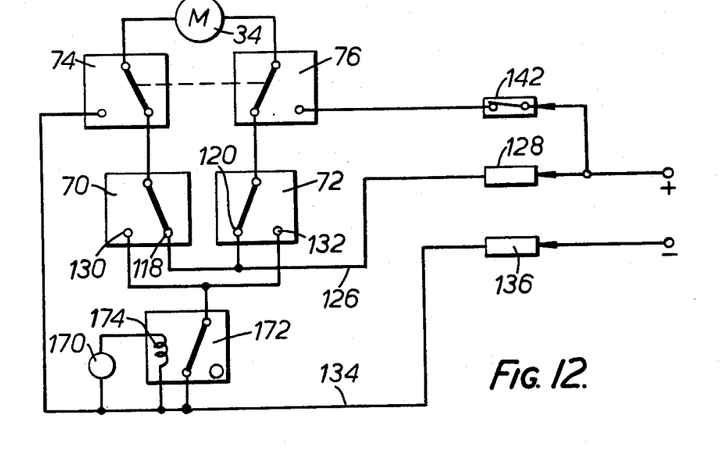
FIG. 12 is a modified circuit.
Figure 14:
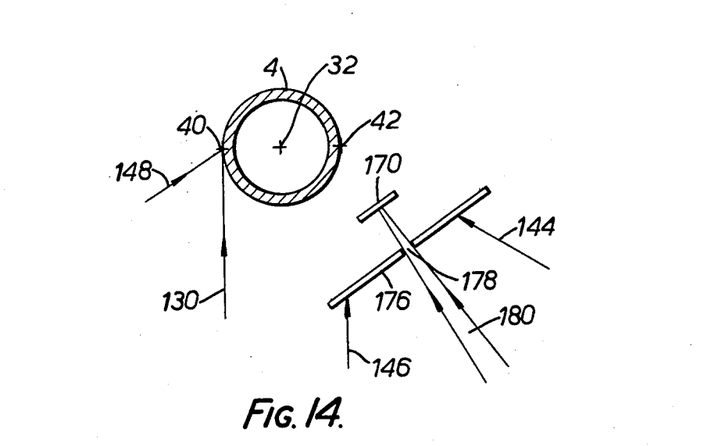
FIG. 14 shows an arrangement which utilizes a single photo-electric cell.

A modified circuit is illustrated in FIG. 12 and this is suitable for operation with a single cell as located for instance in the arrangement shown in FIG. 14. In this circuit the switches 70, 72, 74 and 76 function as in the circuit of FIG. 11 except that the terminals 130 and 132 are connected to the negative line 134 via a relay 172, the coil 174 of which is actived by the cell 170. Further the terminals 118 and 120 are directly connected to the positive line 126. It will be noted that operation of the relay 172 isolates the terminals 130, 132 from the negative line 134 thus breaking the circuit to the motor 34 except when the overload relays are activated. In this arrangement as soon as the cell 170 produces enough current to operate the relay 172, the motor will stop. Accordingly it is desirable to arrange for collimation of the radiation from the reflector so that tracking is more accurate. FIG. 14 illustrates a simple technique for achieving collimation by means of an aperture 178 formed in a shield 176 so that only a narrow band 180 of radiation can impinge on the cell 170.

FIGS. 9 and 10 illustrate the preferred mounting for the photo-electric cells. The plate 98 is formed with a laterally extending kinked portion 182, the cells 90 and 92 being located on the lower part of the kinked portion. The plate 98 functions as a heat sink for the cells 90 and 92 and the preferred mounting method is shown schematically in FIG. 10. In this arrangement the cell wafer is located on a conductive plate 98 which engages an insulating layer 186 which in turn rests on a carrier plate 188. Spring contacts 190 engage terminals 192 provided on the cell 90 and are connected by a conductor (not shown) to one end of the relay coil 102, the plate 98 being connected to the other end of the coil. This mounting of the cells has been found to be especially advantageous particularly in dissipating heat which is incident upon the cells. As diagrammatically illustrated in FIG. 9 the cells and parts of the plate 98 are shielded from solar radiation by reflective shields 194.

Figure 15:
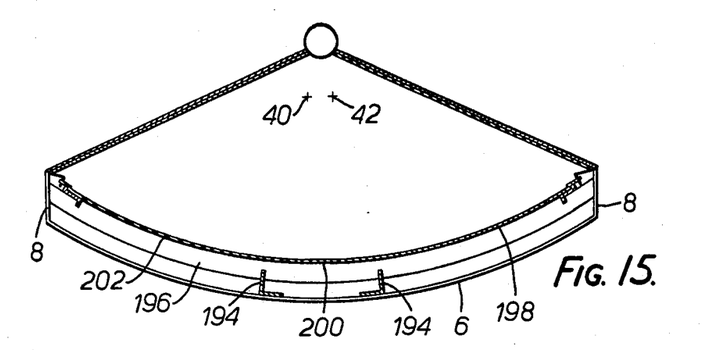
FIG. 15 is a transverse section showing the construction of the trough in accordance with the invention.

The preferred construction for the trough will now be described with reference to FIGS. 15 to 18. FIG. 15 shows the housing 6 as having a generally parabolic configuration with upturned side walls 8. Extending longitudinally of the housing are two support beams 194 of L-section. The beams 194 provide central support for a plurality of ribs 196 which are connected at their outer ends to the side wall 8. The ribs 196 each have an accurately cut concave edge 198 which has a central flat 200 located directly beneath the support bar 12 and approximately the same width as the tube 4.

Figures 16, 17, 18:
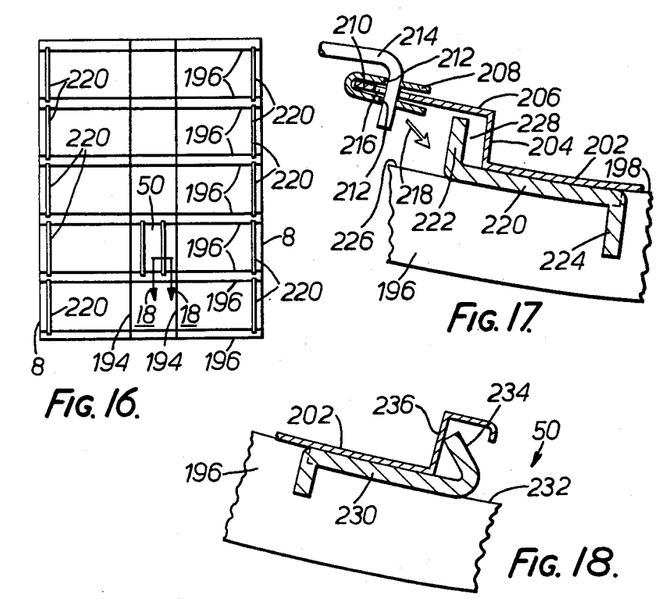
FIG. 16 is a schematic plan view of the trough.
FIG. 17 is a more detailed cross-sectional view illustrating the construction of the trough.
FIG. 18 is a partial cross-section taken along the line 18—18.

On either side of the flat 200 are two parabolic edge portions which have their respective focii on the lines 40 and 42. There are a number of ribs 196 and each of them are supported so that their edges 198 are aligned so that the parabolic portions lie on respective parabolic surfaces and sheets 202 of highly reflective material such as aluminium are held in engagement with the edges 198 so that the sheets 202 assume the appropriate parabolic configurations. FIG. 16 illustrates a view of a typical trough with the sheets 202 removed. In this arrangement it will be noted that the ribs 196 are arranged in pairs along the length of the trough except at the ends, so that wide strips of sheet material 202 can be laid transversely across the trough, the edges of the strips being adjacent to respective ribs. The opening 50 through which the tapes 44 and 46 pass is formed by a pair of shorter strips one on either side of the gap 50, as seen in FIG. 16.

FIG. 17 illustrates the preferred technique for accurately holding the sheets 202 against the parabolic edges 198 of the ribs. The sheet 202 is formed to have a step portion comprising an upward leg 204 and a lateral flange portion 206. The outer edge of the flange portion is located within a stiffening member 208 which is of generally U-shape and in engagement with the outer edge 210 of the flange portion 206. The stiffening member 208 extends for the full width of the sheet 202. The member 208 is provided with pairs of aligned holes 212 through which one end of biasing springs 214 pass. The flange portion 206 is provided with a clearance hole 216 so that the springs 214 do not engage the flange portion 206. The other end of the springs 214 bear against the side walls 8 of the housing and the arrangement is such that the springs 214 bias the sheets 202 in the direction of arrow 218 i.e. towards the centre of the trough and downwardly towards the ribs 196. The stiffening members 208 ensure that the biasing effect of the springs 214 is distributed uniformly along the length of the sheets. The sheets 202 are supported at their outer edges in regions inwardly of the legs 204 by means of beams 220 which are formed with stiffening flanges 222 and 224. The beams 220 are located in rebates 226 formed in the ribs 196 so that the upper surface of the beam is more or less continuous with the parabolic edge 198 as shown, the downturned flange being slotted so as to receive the ribs at the junction points. The beams 220 provide support for the edges of the sheets and ensure that there is no unwanted warping of the sheet material at the edges of the trough. It will be noted that a gap 228 is left between the upturned leg 204 of the sheet and the upturned flange 222 of the beam 220 so as to accommodate differences in thermal expansions between the ribs 196 on the one hand and of the reflective sheet 202 on the other.

FIG. 18 illustrates a suitable mounting for the reflective sheets at the opening 50. In this case the ribs 196 are spanned by a pair of inner support beams 230 located on either side of the gap 50. The beams 230 have downturned flanges which are slotted to receive the ribs 196 and the ribs themselves are formed with rebates 232 to receive the beams 230. The beams 230 are provided with upturned legs 234 against which an upturned leg portion 236 of the sheet 202 abuts as shown. The trough of the foregoing construction has been found to be capable of relatively easy construction and yet provides very accurate focusing which is necessary for efficient operation of the apparatus.

Prototypes of the foregoing construction have been constructed and found to exhibit very accurate tracking of the sun. The tracking can be considered as three distinct modes. In the first mode there is gross misalignment between the trough and the sun as would typically occur at dawn. As disclosed in Australian Patent Application No. 35176/78 the lower ends of the tapes 44 and 46 will cause initial rotation of the trough towards the sun. In the construction of the invention this can be accomplished with a temperature differential of 3° C. or less between the tapes 44 and 46. In the second mode, which occurs when the trough is generally aligned with the sun, concentrated solar radiation from the trough itself will be focused on one or other of the tapes 44 and 46 and this will cause a larger temperature differential between the tapes, the trough being stopped by the cells when it is correctly aligned at the sun. Finally, the third mode is the normal uninterrupted tracking mode in which case the tape which is located in the more westerly directly will more or less continuously have concentrated solar radiation focused on it by one side of the trough and the tracking movements in this case are subject only to light being concentrated on one or more of the photo cells. In the third mode the response time depends only on that of the cells in other words it is very rapid and accordingly very accurate tracking is obtained.

When the sun moves behind a cloud, the apparatus will enter the second mode and it has been found that the diffuse thermal energy received by the trough is sufficient to operate the tapes 44 and 46 so that a course tracking of the sun occurs even through clouds of moderate density. This is most advantageous since when the sun re-emerges from the clouds, the trough can very quickly be brought into correct alignment and resume tracking in the third mode.

Figure 19:
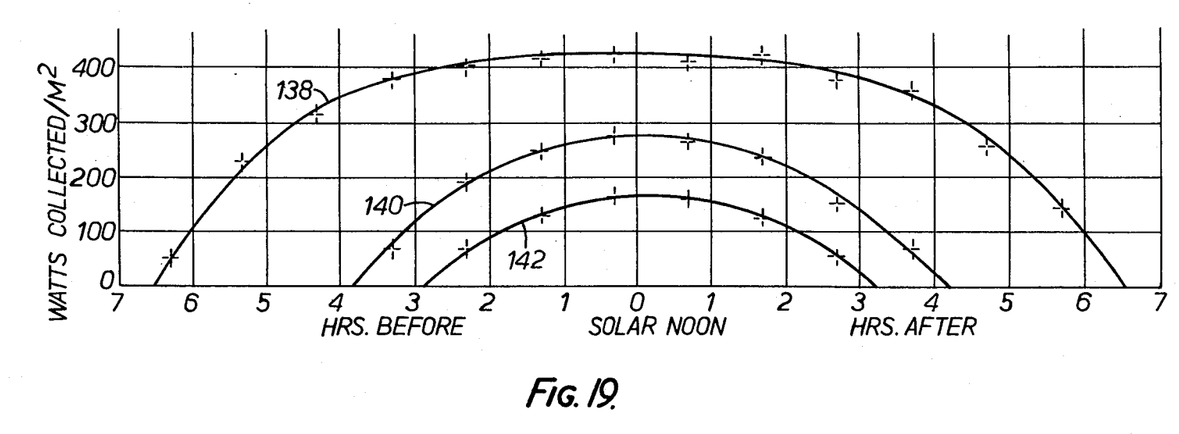
FIG. 19 is a graph showing the performance of the apparatus of the invention compared to flat plate absorber collectors.

FIG. 19 illustrates test results of the tracking apparatus of the invention. The curve 138 shows graphically the output expressed in watts/sq. meter as a function of time and it will be noted that the output is much greater than that produced by flat plate absorber type conversion apparatuses which were tested at the same time, the outputs of two of such apparatuses being shown as curves 140 and 142.

I claim:

1. Solar conversion apparatus comprising: concentrating means for concentrating solar energy onto at least one surface; tracking means for causing the concentrating means to track the sun, said tracking means including radiation sensitive elements which are operable on differential thermal expansion thereof to generate tracking control signals and an electric motor for moving said concentrating means, said motor being responsive to said control signals; and over temperature sensing means operable to override said tracking means and cause the motor to move the concentrating means out of alignment with the sun.

2. Apparatus as claimed in claim 1 wherein the over temperature sensing means includes an over temperature switch which is mechanically coupled to said surface and is responsive to thermal expansion thereof.

3. Solar conversion apparatus comprising concentrating means for concentrating solar energy onto at least one surface, tracking means for causing the concentrating means to track the sun, said tracking means including first radiation sensitive elements which are responsive to thermal components of solar radiation and are operable to produce first control signals for initiating tracking movements of the concentrating means and at least one second radiation sensitive element which is responsive to non-thermal components of solar radiation and is operable to produce second control signals for arresting tracking movements of the concentrating means.

4. Apparatus as claimed in claim 3 wherein said at least one second radiation sensitive element is responsive to the optical or ultra-violet components of solar radiation.

5. Apparatus as claimed in claim 3 wherein said first elements comprise thermally expansive metallic tapes disposed relative to said concentrating means such that differential expansion of said tapes occurs when said concentrating means is not aligned with the sun.

6. Apparatus as claimed in claim 3 wherein said at least one second element comprises a photo-electric element upon which solar energy impinges when said concentrating means is directed at the sun.

7. Apparatus as claimed in claim 6 wherein said photoelectric element is located so as to receive concentrated solar radiation from said concentrating means.

8. Apparatus as claimed in claim 6 or 7 including collimating means for collimating solar radiation prior to impingement on said photo-electric element.

9. A method of collecting solar energy comprising moving solar energy concentrating means such that the concentrating means concentrates solar energy on a heat transfer surface; generating control signals by means of at least one element which is sensitive to infra-red components of solar radiation for initiating tracking movements of concentrating means toward alignment of the concentrating means with the sun; and generating an arresting signal by means of at least one element which is sensitive to visible or ultra-violet components of solar radiation for arresting tracking movements of the concentrating means when the concentrating means is correctly aligned with the sun.

10. A method of collecting solar energy comprising moving solar energy concentrating means such that the concentrating means concentrates solar energy onto at least one surface, generating control signals by means of at least one element which is sensitive to infra-red components of solar radiation for initiating tracking movements of the concentrating means toward alignment of the concentrating means with the sun; and generating an arresting signal by means of at least one photoelectric element for arresting tracking movements of the concentrating means when the concentrating means is correctly aligned with the sun.

11. Solar conversion apparatus comprising: concentrating means for concentrating solar energy onto at least one surface; tracking means for causing the concentrating means to track the sun, said tracking means including radiation sensitive elements comprising thermally expansible metallic tapes which are operable on differential thermal expansion thereof to generate tracking control signals and an electric motor for moving said concentrating means, said motor being responsive to said control signals, said sensitive elements having a predetermined response time during which they are subjected to radiation before said control signals are generated for initiating movement of said motor, and arresting means including at least one photoelectric cell for arresting movement of said motor when the concentrating means is concentrating solar energy onto said surface, said arresting means having a response time which is shorter than that of said radiation sensitive elements.

12. Apparatus as claimed in claim 11 wherein said cell or cells are located in close proximity to said surface.

13. Apparatus as claimed in claim 12 wherein said tapes receive concentrated solar radiation from said concentrating means when said concentrating means is not correctly aligned with the sun.

14. Apparatus as claimed in claim 13 wherein the tracking is operable to rotate said concentrating means about a tracking axis, said surface comprises the outer surface of a heat transfer conduit located along said tracking axis, and wherein said concentrating means comprises a reflective trough which has a base line parallel to said tracking axis, a plane including said base line and said tracking axis also including the sun when the trough is correctly aligned therewith and wherein there are first and second of said metallic tapes are located on opposite sides of said plane, said first and second tapes being coupled to activate first and second switches respectively on predetermined expansion thereof.

15. Apparatus as claimed in claim 14 wherein said motor is a reversible motor said first and second switches being operable to make a driving current circuit in a predetermined polarity to said motor and wherein said cell or cells operate to break said circuit.

16. Apparatus as claimed in claim 15 wherein each cell or cells are connected to the operating coil of a relay which has its contacts in said circuit, whereby said circuit is broken when said cell or one of said cells are irradiated by concentrated radiation from the concentrating means.

17. Apparatus as claimed in claim 16, wherein there is a single relay which the operating coil of which is connected to a cell or a pair of cells connected in parallel.

18. Apparatus as claimed in claims 16 or 17 including collimating means for shielding said cell or cells from radiation from said concentrating means except for a narrow beam which can pass through said collimating means.

19. Solar conversion apparatus comprising: concentrating means for concentrating solar energy onto at least one surface; means mounting said concentrating means for rotation about a pair of non-rotating shafts; and brackets for supporting said shafts, said shafts being connected to said brackets by connecting means which yield when a predetermined high rotational force is transmitted to said shafts by said concentrating means; tracking means for causing the concentrating means to track the sun, said tracking means including radiation sensitive elements which are operable on differential thermal expansion thereof to generate tracking control signals and an electric motor for moving said concentrating means, said motor being responsive to said control signals.

20. Apparatus as in claim 19 wherein said mounting means includes a friction clutch which resists rotational movement of said concentrating means so as to prevent unwanted vibration or chattering of said concentrating means.

21. Solar conversion apparatus comprising concentrating means for concentrating solar energy onto at least one surface; tracking means for causing the concentrating means to track the sun; first and second solar radiation sensitive elements which are responsive to infra-red radiation for initiating tracking movements of said concentrating means in first or second directions respectively depending upon differential impingement of solar radiation on said elements; and at least one third solar radiation sensitive element which is responsive to visible or ultra-violet radiation and which is disposed to receive solar energy only when said concentrating means is aligned with the sun and is operable, on irradiation thereof, to arrest movement of the concentrating means.

22. Solar conversion apparatus comprising concentrating means for concentrating solar energy onto at least one surface and tracking means for causing the concentrating means to track the sun, said tracking means including a reversible electric motor coupled to cause movement of said concentrating means; first and second thermally responsive elements operable to actuate first and second switches respectively, actuation of said first and second switches completing an electric circuit to said motor for causing operation of said motor in forward or reverse directions respectively and an optical or ultra-violet sensitive switching means for breaking said circuit when said concentrating means is directed at the sun.

23. Apparatus as claimed in claim 22 wherein said concentrating means comprises a reflective trough having first and second parabolic portions having first and second focal lines respectively and wherein said optical or ultra-violet sensitive switching means comprises a first pair of photocells located adjacent to said surface and so disposed relative to one another to receive radiation reflected from extreme parts of said first parabolic portion when the concentrating means is correctly aligned with the sun and a second pair of photocells located adjacent to said surface and so disposed relative to one another to receive radiation reflected from extreme parts of said second parabolic portion when the concentrating means is correctly aligned with the sun.

24. Apparatus as claimed in claim 22 or 23 wherein said thermally responsive elements comprise metallic tapes and said optical or ultra-violet sensitive switching means includes a photo-voltaic element.

25. Apparatus as claimed in claim 22 or 23 wherein said circuit includes over-temperature switching means operable to complete said circuit independently of said first and second switches and said optical or ultra-violet sensitive switching means.

26. Apparatus as claimed in claim 25 including a position sensitive switch which is sensitive to the orientation of the concentrating means and is operable to break the circuit to said motor made by said over-temperature switching means when said concentrating means is in a generally inverted position.

27. Solar conversion apparatus comprising concentrating means for concentrating solar energy onto at least one surface, tracking means for causing the concentrating means to track the sun, said tracking means including first temperature sensitive elements which are responsive to thermal components of solar radiation and are operable to produce first control signals for initiating tracking movements of the concentrating means and at least one second element comprising a photovoltaic device which is responsive to solar radiation and is operable to produce second electronic control signals for arresting tracking movements of the concentrating means.

28. Apparatus as claimed in claim 27 wherein said first elements comprise thermally expansible metallic tapes disposed relative to said concentrating means such that differential expansion of said tapes occurs when said concentrating means is not aligned with the sun.

29. Apparatus as claimed in claim 28 wherein said photovoltaic device is located so as to receive concentrated solar radiation from said concentrating means.

30. Apparatus as claimed in claim 29 including collimating means for collimating solar radiation prior to impingement on said photovoltaic device.

31. Solar conversion apparatus as claimed in claim 27 wherein said tracking means includes a reversible electric motor coupled to cause movement of said concentrating means; said first temperature responsive elements being operable to actuate first and second switches, actuation of said first and second switches completing an electric circuit to said motor for causing operation of said motor in forward or reverse directions respectively and said photovoltaic device being operable to actuage switching means for breaking said circuit when said concentrating means is directed at the sun.

32. Apparatus as claimed in claim 31 wherein said concentrating means comprises a reflective trough having first and second parabolic portions having first and second focal lines respectively and wherein said at least one second element comprises a first pair of photocells located adjacent to said surface and so disposed relative to one another to receive radiation reflected from extreme parts of said first parabolic portion when the concentrating means is correctly aligned with the sun and a second pair of photocells located adjacent to said surface and so disposed relative to one another to receive radiation reflected from extreme parts of said second parabolic portion when the concentrating means is correctly aligned with the sun.

33. Apparatus as claimed in claim 32 wherein said temperature sensitive elements comprise metallic tapes.

34. Apparatus as claimed in claim 31 or 32 wherein said circuit includes over-temperature switching means operable to complete said circuit independently of said first and second switches and said photovoltaic device.

35. Apparatus as claimed in claim 34 including a position sensitive switch which is sensitive to the orientation of the concentrating means and is operable to break the circuit to said motor made by said over-temperature switching means when said concentrating means is in a generally inverted position.

* * * * *